US007831103B2

(12) United States Patent
Mahiar et al.

(10) Patent No.: US 7,831,103 B2
(45) Date of Patent: Nov. 9, 2010

(54) DIGITAL IMAGES

(75) Inventors: Irani Firdaus Mahiar, Bangalore (IN); Jain Kapil Dinesh, Bangalore (IN)

(73) Assignee: Tata Consultancy Services Limited, Mumbai (IN)

(*) Notice: Subject to any disclaimer, the term of this patent is extended or adjusted under 35 U.S.C. 154(b) by 911 days.

(21) Appl. No.: 11/716,781

(22) Filed: Mar. 12, 2007

(65) Prior Publication Data

US 2007/0217699 A1 Sep. 20, 2007

(30) Foreign Application Priority Data

Mar. 17, 2006 (IN) ........................ 382/MUM/2006

(51) Int. Cl.
*G06K 9/36* (2006.01)
*G06K 9/46* (2006.01)

(52) U.S. Cl. ....................................... 382/239; 382/240

(58) Field of Classification Search ....................... None
See application file for complete search history.

(56) References Cited

U.S. PATENT DOCUMENTS

| | | | | |
|---|---|---|---|---|
| 6,760,482 | B1 * | 7/2004 | Taubman | 382/240 |
| 6,987,890 | B2 * | 1/2006 | Joshi et al. | 382/240 |
| 6,993,199 | B2 * | 1/2006 | Chebil | 382/240 |
| 7,308,146 | B2 * | 12/2007 | Becker et al. | 382/233 |
| 7,668,380 | B2 * | 2/2010 | Marcellin et al. | 382/232 |
| 7,672,523 | B2 * | 3/2010 | Yeung et al. | 382/239 |

* cited by examiner

*Primary Examiner*—Yuzhen Ge
(74) *Attorney, Agent, or Firm*—Charles A. Muserlian

(57) ABSTRACT

A rate control means for rate allocation in JPEG2000 processing apparatus is disclosed. The rate control means includes means to receive various parameters from the tier-1 coder and means to calculate R-D slope, means for composing a bucket element, means for comparing the RD slope of each bucket element with the threshold slope of each bucket, and selecting the bucket into which the current element is to be added; means for accepting the selected bucket number and generating an address for storing the current bucket element; means for keeping a count of, number of elements in each bucket and the sum of the differential byte count of each element in that bucket; for all buckets; means for including the bucket elements and means for keeping the record of number of coding passes and number of bytes to be included for each code block, during and after the rate control.

1 Claim, 2 Drawing Sheets

DIGITAL IMAGES

FIELD OF INVENTION

Figure 1:
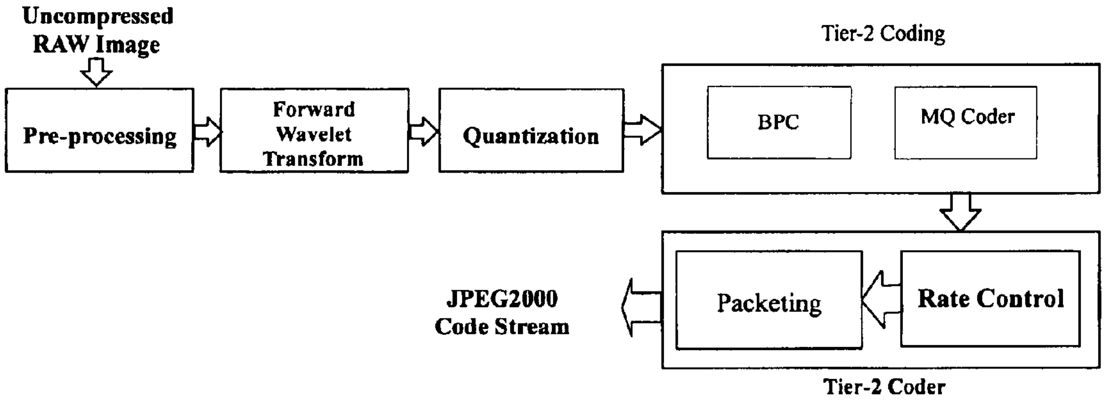

The invention relates to digital images.

Particularly, the invention relates to compression of digital images. More particularly, the invention relates to JPEG2000 standard for efficient compression of digital images.

BACKGROUND OF THE INVENTION

Introduction:

A digital image or "bitmap" consists of a grid of dots or "pixels" with each pixel defined by a numeric value that gives its color. The number of different colors in a digital image is given by the number of bits assigned to each pixel. The common "color resolutions" are 1 bit per pixel for solid black-and-white nonrealistic images, 8 bits per pixel for gray-scale images, nonrealistic color images and coarse realistic images, 24 bits per pixel for "photographic quality" of realistic images and 48 bits per pixel is used for ultrahigh quality images.

An image stored in an uncompressed file format, such as the popular BMP format, usually occupies huge memory space. An image with a pixel resolution of 640 by 480 pixels and 24-bit color resolution will take up 640*480*24/8=921,600 bytes in an uncompressed format. Therefore compression of still image files has become a necessity. The increased use of digitized images, particularly on the Internet, has led to the need to compress such images to allow economical storage and fast data transfer.

In the field of digital image compression, many different techniques have been utilized, such as the JPEG (Joint Photographic Experts Group) standard, Wavelet Transform Compression, Fractal Image Compression, Vector Quantization and the like. In particular, the method known as JPEG and the recent update known as JPEG2000 have become industry standards.

In the basic JPEG method, an image is transformed into a luminance/chrominance color representation conventionally denoted as YUV or YCbCr, where Y is a primary color or luminance component and U and V or Cb and Cr are secondary color components. By averaging together groups of pixels, the number of secondary components stored is reduced. The pixel values for each component are grouped into blocks and each block is transformed by a discrete cosine transform (DCT). In each block, the resulting DCT coefficients are quantized, that is divided by a predetermined quantization coefficient and rounded to integers. The quantized coefficients are encoded based on conditional probability by Huffman or arithmetic coding algorithms known in the art. A normal interchange JPEG file includes the compression parameters, including the quantization tables and encoding tables, in the file headers so a decompression program can reverse the process. The major problems in JPEG compression include a moderate compression ratio, a block effect, and poor progressive image quality.

JPEG 2000 standard is designed to overcome some of the drawbacks of JPEG standard. JPEG2000 standard is an ISO/IEC standard (ISO/IEC 15444-1:2004) for efficient image compression of digital images. In JPEG 2000 standard, the whole image is divided into one or more image tile components; each of these image tile components are then 2-D discrete wavelet transformed using 2-D discrete wavelet transformation. The transform coefficients of each image tile component are then grouped into sub-bands, these sub-bands are further partitioned into rectangular code blocks, and each code block is entropy encoded.

The uncompressed RAW image, which is input sample data, is fed to a pre-processor. The pre-processor block has an encoder. The encoder transforms the range of the input sample data to a nominal dynamic range so that it is approximately centered about zero. If the input sample data is +/−, then it is assumed they are centered at zero. Otherwise, the absolute sample values in each component are level shifted (DC offset) by subtracting a fixed value from each sample to make its value symmetric around zero. Then the discrete wavelet transform (DWT) is applied in each tile to decompose it into a number of wavelet sub-bands at different levels and resolutions.

DWT is an important process to generate resolution-scalable bit streams and decompose the spatial correlation. The output of this stage is a set of transformed coefficients. These transformed coefficients are then quantized. Quantization is used only in lossy compression. The wavelet coefficients in each sub-band are scalar quantized. The quantization step size is calculated based on the dynamic range of the sub band values and constants defined in the standard. The purpose of quantization is to reduce the precision of the sub band coefficients so that fewer bits will be needed to encode the transformed coefficients.

The encoding phase is divided into two steps Tier-1 and Tier-2 coding. The Tier-1 coding is responsible for compressing the coefficient data into a byte stream. The Tier-2 coding consists of Rate Control and Packeting, which is responsible for trimming and organizing this byte stream into a JPEG2000 compliant File format.

Rate control is an important feature provided by JPEG2000 standard. This feature allows an encoder to compress a given image file to a specified target file size, ensuring that this size limit is not exceeded and maximum visual information is packed within. This requires computation of what information is more important visually and what is less, what is to be included in the given file size and what is to be truncated.

The standard rate control scheme used in JPEG2000 calculates the slope as below:

$$RD\ \text{Slope}=(2^{2b}\times Rlvl\_synw^2\times \text{Band}\_synw^2\times NMSE\_redc)/\Delta R$$

Where,

- RD Slope: is the ratio of Distortion and rate
- b: is the bit plane number to which the current truncation point belongs
- R1v1_synw: is a value of synthesis weight for the selected wavelet filter depending on the current resolution level to which the code block belongs.
- Band_synw: is a value of synthesis weight for the selected wavelet filter depending on the current sub-band to which the code block belongs.
- NMSE_redc: is a coefficient value computed based on information content in each coding pass and gives an estimate of mean squared error that would result if this coding pass is not included.
- ΔR: is the difference in byte count from previous truncation point of code block up to current truncation point for the code block.

One can see that the computation required to calculate the slope using this suggestive technique is quite complex and would require a lot of computation resource and time to implement in hardware.

This RD slope computation is followed by the Newton-Raphson iterative method to find the best-fit element. All the elements are sorted based on their slopes and then checked if including half of them exceeds the specified limit or not. If it does, then one fourth of these elements are taken and same check is performed, else three fourth of these elements are taken and the check is performed. This process is repeated until it finds the best fit. This computation is called Rate-Distortion Analysis and is handled in the last stage of the encoder namely packeting.

Tier-2 coder operates on the compressed information of every block to arrange their contributions in each quality layer, in a process referred to as packetization. Packeting involves assembling of the final Code-stream in a standard defined file format, which complies with any standard JPEG2000 qualified decoder.

Conventionally, rate distortion is computed for all independent data blocks. It then uses an iterative method for computing a threshold and including the required information and checking for the target file size limit. The disadvantage of this method is that it drastically increases the computation effort and the time required, thereby making it almost impossible for hardware implementation.

An object of the present invention is to overcome the disadvantages of conventional method of digital image compression described before.

Another object of this invention is to provide a simplified formula for the computation of the RD slope.

Another object of this invention is to provide a non-iterative, computationally efficient and hardware friendly system for rate allocation for digital image compression.

Another object of this invention is to reduce the time required for digital image compression.

SUMMARY OF THE INVENTION

According to this invention, there is provided a system of rate allocation in a standard JPEG2000 processing apparatus, the said apparatus consisting of:
(i) a preprocessing block, for receiving uncompressed RAW image in a tile format, having an encoder which transforms the range of the input sample data into a nominal dynamic range so that it is approximately centered about zero, if the input sample data is +/− it is assumed they are centered at zero, otherwise, the absolute sample values in each component are level shifted (DC offset) by subtracting a fixed value from each sample to make its value symmetric around zero;
(ii) a forward wavelet transforming block for decomposing each tile into a number of wavelet sub-bands at different levels and resolutions and producing a set of transformed coefficients;
(iii) a quantization block for calculating quantization step size based on the dynamic range of the sub band values and constants defined in the standard and reducing precision of sub band coefficients in order to have fewer bits to encode the transformed coefficients;
(iv) a tier-1 coder block for compressing the coefficient data into a byte stream;
(v) a tier-2 coder means for trimming and organizing this byte stream into a JPEG2000 compliant File format, the said means comprising:
(a) a rate control means comprising:
(i) a means adapted to receive resolution level number, sub band number, bit plane number, coding pass number and byte count signal from the tier-1 coder via a memory interface for every code block;
(ii) a means adapted for calculating R-D slope, wherein, the Resolution level number providing information about which resolution level the current code block belongs, the Sub band number providing information about which band the current code block belongs, the Bit plane number providing information on current bit plane, the byte count providing the differential number of compressed bytes for the current code pass and coding pass number providing information on current coding pass; which is to be performed at the end of each coding pass of a code block;
(iii) a means for composing a bucket element, which consist of RD slope, Resolution level number, Sub band number, Code block number, Code pass number, differential byte count, absolute byte count; for each coding pass of the code block;
(iv) a means for comparing the RD slope of each bucket element with the threshold slope of each bucket, and selecting the bucket into which the current element is to be added;
(v) a means for accepting the selected bucket number and generating an address for storing the current bucket element to a location in the local bucket memory;
(vi) a means for keeping a count of, number of elements in each bucket and the sum of the differential byte count of each element in that bucket; for all buckets;
(vii) a means for including the bucket elements, based on the value of their RD slope, while ensuring that the sum of the bytes so included do not exceed the specified size limit; comprising of
  a. a means to identify the bucket to be sorted;
  b. a means to include all elements of all the buckets prior to the bucket to be sorted;
  c. a means to sort the bucket to be sorted;
  d. a means to include the elements of the sorted bucket ensuring that the specified size limit in not exceeded;
(viii) a means for keeping the record of number of coding passes and number of bytes to be included for each code block, during and after the rate control; and
(b) a packeting module means for assembling and producing the final code stream depending on the data and information received from the rate control block.

Other aspects and advantages of the present invention will become apparent upon reading the following detailed description and upon reference to the drawings, which are illustrative only and in anyway do not limit the scope of the invention.

BRIEF DESCRIPTION OF THE ACCOMPANYING DRAWINGS

Figure 2:
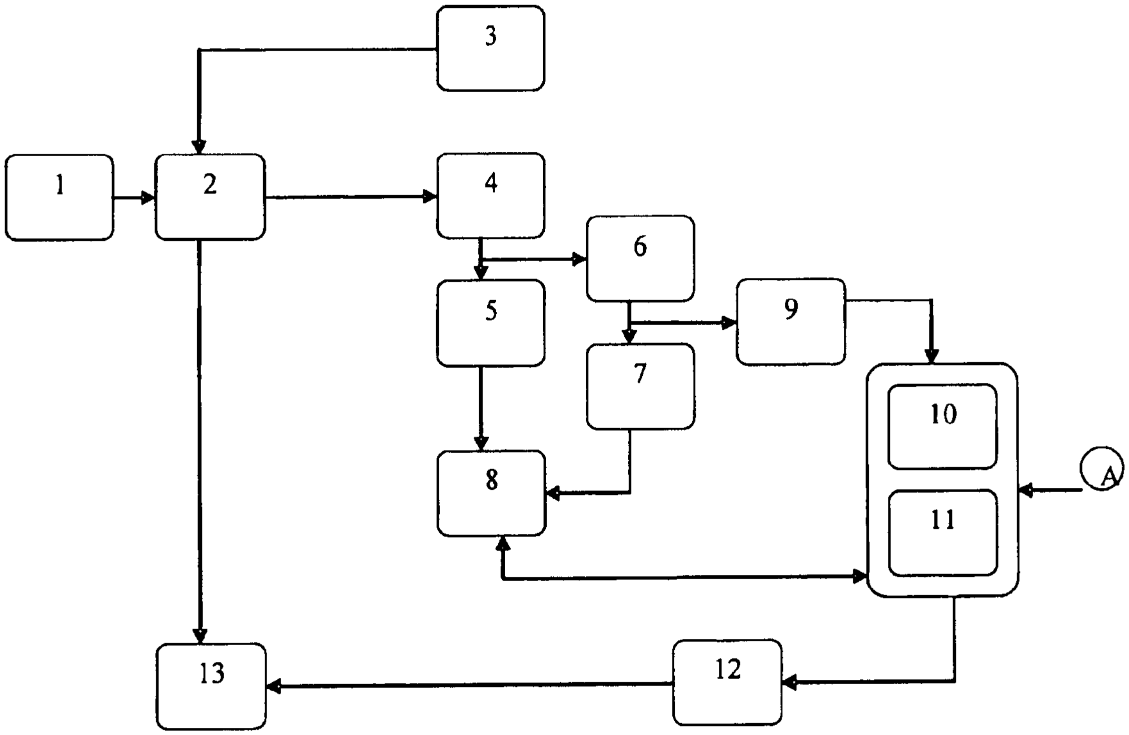

In the accompanying drawings:
FIG. 1 illustrates the block diagram of a JPEG2000 encoder;
FIG. 2 illustrates the internal block diagram of the tier-2 coding system for achieving rate control;

DETAILED DESCRIPTION OF THE ACCOMPANYING DRAWINGS

The invention will now be explained with reference to the FIGS. 1 & 2 of the accompanying drawings.

FIG. 1 illustrates the block diagram of a JPEG2000 encoder. The JPEG2000 encoder consists of:
(i) a preprocessing block, for receiving uncompressed RAW image, having an encoder which transforms the range of the input sample data into a nominal dynamic range so that it is approximately centered about zero, if the input sample data is +/− it is assumed they are centered at zero, otherwise, the absolute sample values in each component are level shifted (DC offset) by subtracting a fixed value from each sample to make its value symmetric around zero;

(ii) a forward wavelet transforming block for decomposing each tile into a number of wavelet sub-bands at different levels and resolutions and producing a set of transformed coefficients;

(iii) a quantization block for calculating quantization step size based on the dynamic range of the sub band values and constants defined in the standard and reducing precision of sub band coefficients in order to have fewer bits to encode the transformed coefficients;

(iv) a tier-1 coder block for compressing the coefficient data into a byte stream, which uses a bit plane coder unit for processing the sub band coefficients bit plane by bit plane starting from most significant bit plane down to least significant bit plane, followed by an context based adaptive binary arithmetic coder for generating a compressed byte stream;

(v) a tier-2 coder means for trimming and organizing this byte stream into a JPEG2000 compliant File format, the tier-2 coder comprises:

(a) a rate control means; and (b) a packeting module means for assembling and producing the final code stream depending on the data and information received from the rate control block.

FIG. 2 illustrates the schematic block diagram of tier-2 coder in accordance with this invention and comprises:

(i) EBCOT Unit (1);

(ii) MAT and CB Memory (2);

(iii) Address Generator (3);

(iv) RD Slope Calculator (4);

(v) Bucket Element Composer (5);

(vi) Bucket Selection Comparator (6);

(vii) Bucket Memory Organizer (7);

(viii) Local Bucket Memory (8);

(ix) Bucket element and Bucket byte counters (9);

(x) Allocator ( 10);

(xi) Sorter (11);

(xii) Code Block Inclusion Table (12);

(xiii) Packeting Unit (13);

The EBCOT unit (1) is responsible for compression and conversion of image data, which is fed into the unit in the form of code blocks, after the discrete wavelet transformation (DWT) and quantization. This code block data after the compression from EBCOT unit comes out in the form of a byte stream. Additional information like the code block number, resolution level number, and the sub band number, and auxiliary information like the differential byte count and number of coding passes, is also provided with the corresponding byte stream. This additional information is required by the packetization unit for efficient packing of the code stream. When EBCOT encoding of a particular code block is in progress the output stream of bytes is stored into code block memory (2) as a set. The organization of this memory is as follows:

Memory:

| | | | | | |
|---|---|---|---|---|---|
| • | | | | | |
| • | | | | | |
| • | | | | | |
| SA | | | | | |
| CB Bytes | NIMSB | $\Delta b_1$ | $\Delta b_2$ | ...... | #CodePass |
| • | | | | | EA |

This set is marked by its start address (SA) and end address (EA). Each set of byte stream consist of the encoded code block bytes from the EBCOT unit (1) and corresponding, Number of insignificant MSBs (NIMSB), differential byte count at truncation points ($\Delta b_n$) and number of coding passes. The map of all such sets is indexed using MAT (2) (Memory allocation table) which has the following structure:

MAT:

| MAT Entry |
|---|
| • |
| • |
| • |
| • |
| • |
| |

Each MAT entry comprises of the Logical Address (LA), the corresponding start address (SA) and end address (EA). The logical address is unique for each Code Block and points to a unique set in memory. A MAT entry has the following structure:

MAT Entry:

| LA | Start Address (SA) | End Address(EA) |
|---|---|---|

Logical Address (LA):

| Resolution Level No | Sub Band No | Code Block No. |
|---|---|---|

The data required for rate control is located in the auxiliary information part of the set pointed to by the addresses of the MAT entry. This is used for calculating the slope of each of the truncation points, for each code block.

The RD Slope Calculator (4) means calculates the slope in the following manner:

It uses the logical address data and calculates the slope using the following simplified formula $$\text{Slope}=(2^{2b}\times CSF(i,j))\div R$$

Where $$R=\sum_{To}^{Tn}\Delta bytecount$$

is the absolute byte count from starting of code block ($T_0$) up to current truncation point ($T_n$) for the current code block, i=Resolution level corresponding to the current truncation point,
j=Sub band type corresponding to the current truncation point,
b=Bit plane number corresponding to the current truncation point CSF (i,j) is lookup table Table for Up to Four Level of DWT:

| | 1 Level | 2 Level | 3 Level | 4 Level |
|---|---|---|---|---|
| HL(1) | 11 | 25 | 85 | 325 |
| LH(2) | 11 | 25 | 85 | 325 |
| HH(3) | 5 | 9 | 25 | 92 |
| LL(0) | 200 | 300 | 400 | 1142 |

Explanation of Table for Up to Four Levels of DWT:

Based on the number of discrete wavelet transform (DWT) levels selected for the compression of the image, the values from the table are selected as follows:

In case of 1 level of DWT we get only 4 bands namely:

| | LL1 | HL1 | LH1 | HH1 |
|---|---|---|---|---|
| Value | 200 | 11 | 11 | 5 |

In case of 2 levels of DWT we get 7 bands namely:

| | LL2 | HL2 | LH2 | HH2 | HL1 | LH1 | HH1 |
|---|---|---|---|---|---|---|---|
| Value | 300 | 25 | 25 | 9 | 11 | 11 | 5 |

In case of 3 levels of DWT we get 10 bands namely:

| | LL3 | HL3 | LH3 | HH3 | HL2 | LH2 | HH2 | HL1 | LH1 | HH1 |
|---|---|---|---|---|---|---|---|---|---|---|
| Value | 400 | 85 | 85 | 25 | 25 | 25 | 9 | 11 | 11 | 5 |

In case of 4 levels of DWT we get 13 bands namely:

| | LL4 | HL4 | LH4 | HH4 | HL3 | LH3 | HH3 | HL2 |
|---|---|---|---|---|---|---|---|---|
| Value | 1142 | 325 | 325 | 92 | 85 | 85 | 25 | 25 |

| | LH2 | HH2 | HL1 | LH1 | HH1 |
|---|---|---|---|---|---|
| Value | 25 | 9 | 11 | 11 | 5 |

Once the slope is calculated by the RD Slope calculator (4), the bucket element composer (5) packs this slope along with the logical address (LA), the code pass number corresponding to the current truncation point, the differential byte count (Δb) and the absolute byte count (R) to form a bucket element as follows:

Bucket Element:

| Slope | LA | Code Pass No. | Δb | R |
|---|---|---|---|---|

Each bucket element is passed on to the Bucket selection comparator (6). The Bucket selection comparator (6) is responsible for assigning the bucket element to a respective bucket. This is done by comparing the slope of each bucket element with the threshold value of each bucket and selecting the bucket number to which the bucket element is to be added.

The Bucket memory organizer (7) is responsible for accepting the selected bucket number from the Bucket selection comparator (6) and accordingly generate an address pointing to a location in Local bucket memory (8), where the current bucket element is to be stored.

The Bucket element and bucket byte counter (9) keeps a count of the number of elements added into each bucket ($B_i$) and the total number of bytes in each bucket so accumulated.

The Size limit (A) is essentially the total number of bytes available for storing the compressed image data. This size limit is calculated as follows:

Size limit=Compressed file size limit−estimated header size

The compressed file size limit is either specified explicitly or inferred from the compression ratio. The estimated header size is predictable and is computed based on the image compression parameters.

The Allocator (10), after all the truncation points of each MAT entry is represented as a bucket element and stored in its respective bucket in the Local bucket memory (8); needs to update the Code block inclusion table (12). Packeting Unit (13) requires this table for deciding how many of these byte elements are to be included in the final code stream.

Code Block Inclusion Table:

| | $CB_1$ | $CB_2$ | . . . | $CB_n$ |
|---|---|---|---|---|
| # coding passes | | | | |
| R | | | | |

Starting from the bucket having the highest threshold slope, the Allocator (10) checks if adding of whole bucket exceeds the specified size limit (A) or not. In case the size limit is not exceeded, the total byte count (TBC) is incremented with the bucket byte count ($BB_i$) and all the elements of this bucket are used for updating of the Code block inclusion table (12). In case the size limit is exceeded, the Sorter (11) is invoked.

The Allocator (10) visits each element in the bucket and checks if number of coding passes of the element is greater than the value logged in the table corresponding to the same code block. If so it updates the table with this new value of coding pass and updates the corresponding absolute included byte count R.

If addition of whole bucket exceeds the limit, then the Sorter ( 11) is invoked. It sorts the elements of the last bucket which could not be included by the Allocator (10). Sorter (11) starts bubble sort on the elements of the selected bucket. At the end of each iteration of bubble sort, the element with the largest value of RD slope is found. It checks if the number of coding pass of this current element is greater than the value logged in the table, if so it checks if inclusion of this element exceeds the size limit. If it does not exceed the size limit, then the Code block inclusion table (12) is updated accordingly.

In the event of finding a bucket element whose number of coding passes is greater than the value logged in the table and inclusion of which exceeds size limit, the Sorter ( 11) signals the end of Rate control.

This entire operation is summarized as

```
Bucketing
For every entry in MAT (Memory Allocation Table)
{
    Get LA (Logical Address of Code block)
    For each Ti (Truncation Point)
    {
        Compute RD Slope
        Compose Bucket element
        Compare RD Slope with Threshold slope of each bucket
        and find Bi (selected Bucket)
        In Bi
            BBi = BBi + Δb
            BElementcount = BElementcount + 1
            Write bucket element to Local bucket memory.
    }
}
Allocator
Take Size Limit
While (TBC + BBi < Size limit)
{
    TBC = TBC + BBi
    For each element of bucket Bi
    {
        If ( Bi.#codingpass > LA.#codingpass)
            Update    LA.#codingpass <= Bi.#codingpass
            Update    LA.Bytecount <= R
    }
    i =i+1
}
Sorter
Sort bucket Bi (using bubble sort, element by element)
For each sorted element of bucket Bi
{
    if ( Bi.#codingpass > LA.#codingpass)
    {
        If (TBC + Δb < Size limit)
            Update    LA.#codingpass <= Bi.#codingpass
            Update    LA.Bytecount <= R
        Else
            Stop
    }
}
```

Summary of Flow of the Method in Accordance with this Invention:

1. Start
2. Bucketing
3. Allocating
4. Sorting
5. Done

Detailed Steps:

1. For every entry in MAT (Memory Allocation Table)
2. Get LA (logical Address of Code block)
3. For each $T_i$ (Truncation Point)
4. Compute RD Slope
5. Compose Bucket element
6. Compare RD Slope with Threshold slope of each bucket and find $B_i$ (selected Bucket)
7. In $B_i$ do
   a. $BB_i=BB_i+\Delta b$
   b. BElementcount=BElementcount+1
   c. Write bucket element to Local bucket memory
8. Take Size Limit
9. While (TBC+$BB_i$<Size limit)
10. TBC=TBC+$BB_i$
11. For each element of bucket $B_i$
12. If ($B_i$.#codingpass>LA.#codingpass)
13. Update LA.#codingpass<=$B_i$.#codingpass
14. Update LA.Bytecount<=R
15. i=i+1 (take next bucket)
16. For each element A in 1 to N-1 of bucket $B_i$
17. For each element B in 2 to N of bucket $B_i$
18. if (B.RDslope>A.RDslope)
    a. Swap (A, B)
19. if ($B_i$.#codingpass>LA.#codingpass)
20. If (TBC+Δb<Size limit)
21. Update LA.#codingpass<=Bi.#codingpass
22. Update LA.Bytecount<=R The apparent advantages of this invention can be summarized as follows:

(i) Simplified RD slope computation
Reduces the computation time required in software and resources required in hardware.

(ii) Non iterative open loop flow
Reduces the computation time. It also makes the time required for achieving rate control definite.

(iii) Sorting of elements of a single bucket instead of sorting all elements
Reduces time to sort, which is proportional to the square of the number of elements to be sorted.

(iv) Use of bubble sort prevents the need of sorting the remaining elements once the size limit is reached
Saves unnecessary computation effort and time.

While considerable emphasis has been placed herein on the various components of the preferred embodiment, it will be appreciated that many alterations can be made and that many modifications can be made in the preferred embodiment without departing from the principles of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

The invention claimed is:

1. A system of rate allocation in a standard JPEG2000 processing apparatus, the said apparatus consisting of:

(i) a preprocessing block, receiving uncompressed RAW image in a tile format, having an encoder which transforms the range of the input sample data into a nominal dynamic range so that it is approximately centered about zero, if the input sample data is positive or negative, it is assumed they are centered at zero, otherwise, the absolute sample values in each component are level shifted (DC offset) by subtracting a fixed value from each sample to make its value symmetric around zero;

(ii) a forward wavelet transforming block decomposing each tile into a number of wavelet sub-bands at different levels and resolutions and producing a set of transformed coefficients;

(iii) a quantization block calculating quantization step size based on the dynamic range of the sub band values and constants defined in the standard and reducing precision of sub band coefficients in order to have fewer bits to encode the transformed coefficients;

(iv) a tier-1 coder block compressing the coefficient data into a byte stream;

(v) a tier-2 coder means for trimming and organizing this byte stream into a JPEG2000 compliant File format, the said tier-2 coder means comprising::

(i) means for receiving a resolution level number, a sub band number, a bit plane number, a coding pass number and a byte count signal from the tier-1 coder via a memory interface for every code block;

(ii) means for calculating R-D slope, wherein, the resolution level number providing information about which resolution level the current code block belongs, the sub band number providing information about which band the current code block belongs, the bit plane number providing information on current bit plane, the byte count providing the differential number of compressed bytes for the current code pass and the coding pass number providing information on current coding pass; which is to be performed at the end of each coding pass of a code block;

(iii) means for composing a bucket element, which consist of the R-D slope, the resolution level number, the sub band number, the code block number, the code pass number, the differential byte count, an absolute byte count; for each coding pass of the code block;

(iv) means for comparing the RD slope of each bucket element with the threshold slope of each bucket, and selecting the bucket into which the current element is to be added;

(v) means for accepting the selected bucket number and generating an address for storing the current bucket element to a location in the local bucket memory;

(vi) means for keeping a count of, number of elements in each bucket and the sum of the differential byte count of each element in that bucket; for all buckets;

(vii) means for including the bucket elements, based on the value of their RD slope, while ensuring that the sum of the bytes so included do not exceed the specified size limit; comprising of 1. means for identifying the bucket to be sorted;
2. means for including all elements of all the buckets prior to the bucket to be sorted;
3. means for sorting the bucket to be sorted;
4. means to include for including the elements of the sorted bucket ensuring that the specified size limit is not exceeded;
5. means for keeping the record of number of coding passes and number of bytes to be included for each code block, during and after the rate control; and (b) packeting module means for assembling and producing the final code stream depending on the data and information received.

* * * * *